(12) United States Patent
Macure et al.

(10) Patent No.: US 10,967,553 B2
(45) Date of Patent: Apr. 6, 2021

(54) PIN CAM DEFLECTOR NUT

(71) Applicant: Guill Tool & Engineering Co., Inc., West Warwick, RI (US)

(72) Inventors: Jacob Macure, Rehoboth, MA (US); Michael E Langlais, Coventry, RI (US)

(73) Assignee: Guill Tool & Engineering Co., Inc., West Warwick, RI (US)

( * ) Notice: Subject to any disclaimer, the term of this patent is extended or adjusted under 35 U.S.C. 154(b) by 0 days.

(21) Appl. No.: 16/935,829

(22) Filed: Jul. 22, 2020

(65) Prior Publication Data
US 2020/0346383 A1 Nov. 5, 2020

Related U.S. Application Data

(63) Continuation of application No. 15/372,451, filed on Dec. 8, 2016, now Pat. No. 10,737,425.

(60) Provisional application No. 62/264,631, filed on Dec. 8, 2015.

(51) Int. Cl.
| | |
|---|---|
| *B29C 48/12* | (2019.01) |
| *B29C 48/25* | (2019.01) |
| *B29C 48/30* | (2019.01) |
| *B29C 48/06* | (2019.01) |
| *B29C 48/10* | (2019.01) |
| *B29C 48/08* | (2019.01) |
| *B29C 48/09* | (2019.01) |
| *B29C 48/13* | (2019.01) |
| *B29C 48/05* | (2019.01) |
| *B29C 48/07* | (2019.01) |
| *B29C 48/03* | (2019.01) |
| *B29C 48/11* | (2019.01) |
| *B29C 48/04* | (2019.01) |

(52) U.S. Cl.
CPC ......... *B29C 48/2566* (2019.02); *B29C 48/06* (2019.02); *B29C 48/25686* (2019.02); *B29C 48/30* (2019.02); *B29C 48/3001* (2019.02); *B29C 48/03* (2019.02); *B29C 48/04* (2019.02); *B29C 48/05* (2019.02); *B29C 48/07* (2019.02); *B29C 48/08* (2019.02); *B29C 48/09* (2019.02); *B29C 48/10* (2019.02); *B29C 48/11* (2019.02); *B29C 48/12* (2019.02); *B29C 48/13* (2019.02); *B29C 48/131* (2019.02)

(58) Field of Classification Search
CPC ......... B29C 48/30; B29C 48/03; B29C 48/04; B29C 48/05; B29C 48/06; B29C 48/07; B29C 48/08; B29C 48/09; B29C 48/10; B29C 48/11; B29C 48/12; B29C 48/13; B29C 48/131
USPC ..................................................... 425/192 R
See application file for complete search history.

(56) References Cited

U.S. PATENT DOCUMENTS

| | | | |
|---|---|---|---|
| 6,589,454 B1 * | 7/2003 | Santelli, Jr. ............. | B29C 48/12 264/40.1 |
| 8,899,550 B2 * | 12/2014 | Tiberghien .............. | F16L 31/00 251/149.6 |

* cited by examiner

*Primary Examiner* — Joseph S Del Sole
*Assistant Examiner* — Lawrence D. Hohenbrink, Jr.
(74) *Attorney, Agent, or Firm* — Ziegler IP Law Group, LLC

(57) ABSTRACT

The present disclosure generally relates to extrusion die systems. In particular, the present disclosure relates to a specialty pin cam nut designed for the ease of assembly and disassembly of extrusion dies.

5 Claims, 5 Drawing Sheets

PIN CAM DEFLECTOR NUT

FIELD

The present disclosure generally relates to extrusion die systems. In particular, the present disclosure relates to a specialty pin cam nut designed for the ease of assembly and disassembly of extrusion dies.

BACKGROUND

Extrusion is the pressurized processing of molten material through a die to form the material into a specific shape. Extrusion dies can range from the very simple designs such as a hole through a piece of metal to complex assemblies involving multiple components including deflectors which help to form the plastic into the desired shape. The process of assembling or disassembling complex dies can often be time consuming for an extrusion line operator. There are a number of reasons why disassembly and reassembly of a die may occur including maintenance, cleaning or a tooling change. The time required for assembly and disassembly can have an effect on the up time of an extrusion line and therefore productivity. As such, die assemblies should be manufactured in a way to minimize the amount of down time.

Assembly and disassembly often involves the use of large diameter threaded components and/or bolts to fasten components together. While these are effective methods of fastening, they are also relatively time consuming as each threaded component or bolt requires multiple turns to fasten or remove which can often be a struggle if material in the die is acting as to adhere components to each other.

SUMMARY

The aspects of the disclosed embodiments provide a means of fastening die components in a manner that improves efficiency and product yield while minimizing time and effort for die assembly and disassembly. A cam nut works such that upon rotation in one direction one or more short length helical surfaces will move along pins or machined features tightening the nut to the other component. If the nut is rotated in the opposite direction, the cam nut will loosen until can it be removed and optionally upon further rotation hits another helical surface upon which further rotation will force removal. This nut can be attached to or be integrated into many different die components which may need to be fastened to or removed from other components. Components the cam nut can be used to fasten or remove include but are not limited to deflectors, tips and dies. Many die assemblies contain a die body which acts as the primary component which houses other die components or to which other components are attached to. The die body will typically be what the cam nut attaches to. However, the cam nut could also be retained by the body and be rotated to attach to other components. The cam nut can be designed to attach internally to the body or be made to attach externally to the die body. The cam nut can be turned or actuated by handles, a separate tool, a motor or other means of rotation.

In one embodiment, the aspects of the disclosed embodiments are directed to a device comprising:

a first extrusion die subassembly containing a pitched groove;

a second extrusion die subassembly mated and aligned to the first extrusion die subassembly containing a pin;

said first subassembly pitched groove angled such that the second subassembly pin will align to said first extrusion die subassembly pitched groove such that fully tightening second subassembly in under one rotation in one direction, and fully loosening said second subassembly in under one rotation in the opposite direction.

Another embodiment relates to a device designed such that when rotated in the loosening direction will eject the first component or subassembly and third component or subassembly from the second component or subassembly or such that when rotated in the loosening direction will eject the second component or subassembly from the first component or subassembly and third component or subassembly. This device could also contain a spring.

The aspects of the disclosed embodiments also relate to a method of fastening multiple extrusion die subassemblies in which a first subassembly is fully fastened or fully loosened from a second subassembly by under one (a fractional) rotation of one or more of said subassemblies.

Another embodiment relates to a method in which continued rotation in the loosening direction will eject one assembly from another.

Another embodiment relates to a method in which a first subassembly is fastened to a second subassembly resulting in a third component or subassembly being retained.

Another embodiment relates to a method in which a spring is compressed during the tightening of the device.

Another embodiment relates to a method in which the first subassembly attaches to an external surface of the second subassembly.

Another embodiment relates to a method in which the first subassembly attaches to an internal surface of the second subassembly. The present invention also relates to a method of fastening multiple extrusion die subassemblies in which a first subassembly is fully fastened or fully loosened from a second subassembly by under one rotation of one or more of said subassemblies.

Another embodiment relates to a method in which continued rotation in the loosening direction will eject one assembly from another.

Another embodiment relates to a method in which a first subassembly is fastened to a second subassembly resulting in a third component or subassembly being retained.

Another embodiment relates to a method in which a spring is compressed during the tightening of the device.

Another embodiment relates to a method in which the first subassembly attaches to an external surface of the second subassembly.

Another embodiment relates to a method in which the first subassembly attaches to an internal surface of the second subassembly. The present invention also relates to a method of fastening multiple extrusion die subassemblies in which a first subassembly is fully fastened or fully loosened from a second subassembly by under one rotation of one or more of said subassemblies.

Another embodiment relates to a method in which continued rotation in the loosening direction will eject one assembly from another.

Another embodiment relates to a method in which a first subassembly is fastened to a second subassembly resulting in a third component or subassembly being retained.

Another embodiment relates to a method in which a spring is compressed during the tightening of the device.

Another embodiment relates to a method in which the first subassembly attaches to an external surface of the second subassembly.

Another embodiment relates to a method in which the first subassembly attaches to an internal surface of the second subassembly. The present invention also relates to a method of fastening multiple extrusion die subassemblies in which a first subassembly is fully fastened or fully loosened from a second subassembly by under one rotation of one or more of said subassemblies.

Another embodiment relates to a method in which continued rotation in the loosening direction will eject one assembly from another.

Another embodiment relates to a method in which a first subassembly is fastened to a second subassembly resulting in a third component or subassembly being retained.

Another embodiment relates to a method in which a spring is compressed during the tightening of the device.

Another embodiment relates to a method in which the first subassembly attaches to an external surface of the second subassembly.

Another embodiment relates to a method in which the first subassembly attaches to an internal surface of the second subassembly.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the present disclosure, and together with the general description given above and the detailed description given below, serve to explain the principles of the present disclosure. As shown throughout the drawings, like reference numerals designate like or corresponding parts.

DETAILED DESCRIPTION

Figure 1:
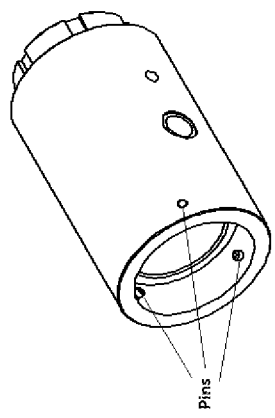
FIG. 1 shows an example die body with pins protruding internally which would house and attach internally to the cam nut and deflector shown in FIG. 2.
Figure 2:
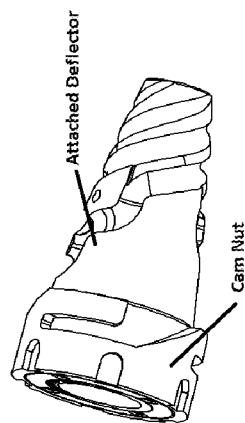
FIG. 2 shows an example cam nut with an attached deflector.

The aspects of the disclosed embodiments involve at least two components; the component that is being fastened while attached to the cam nut and the component which contains pins or machined features that the cam nut is attaching to. The cam nut can be designed to attach to the interior surface of a component or to an exterior surface. Also the cam nut and its mating component could have their features switched to perform the same fastening and disassembly functions. For instance the cam nut could contain the pins or other machined feature while the mating component would contain the cam design which allows for tightening and optionally rapid removal. FIG. 1 shows an example die body with pins protruding internally which would house and attach internally to the cam nut and deflector shown in FIG. 2.

Figure 3:
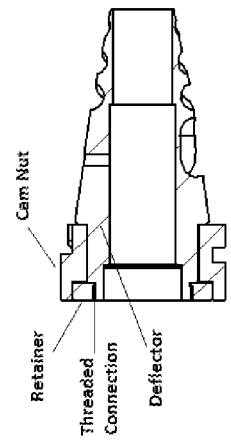
FIG. 3 shows an example cross section showing how a cam nut can be attached to a deflector.

Depending on the component and if the cam nut has a secondary surface for rapid removal, a third component may be necessary to allow for rotation of the cam nut without rotation of the deflector, die, tip, or other primary die component. In FIG. 3, a retainer component is threaded onto a deflector and acts to lock the cam nut from sliding off the deflector while allowing the cam nut to move rotationally as the deflector remains stationary.

Figure 4A:
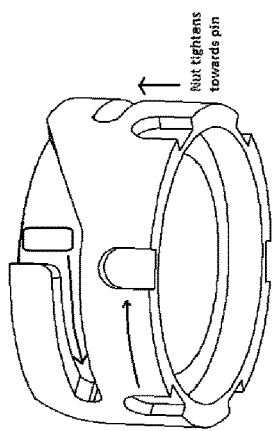
FIG. 4(a) shows the first step of assembly involves sliding the cam nut towards the pin such that it is roughly aligned with surface 1.
Figure 4B:
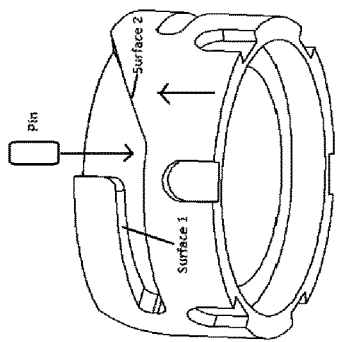
FIG. 4(b) The second step involves rotating the cam nut such that the pin slides along surface 1 tightening the assembly.

FIGS. 4(a)-(b) demonstrate the fastening process to use an internal version of the cam nut. The cam nut fastening process begins with sliding the cam nut and attached components forward into the pin or locking feature bearing component such that the pin or feature roughly aligns with Surface 1. Using tools such as handles, wrenches, or motors, the cam nut is rotated such that the pin or locking feature slide along the pitched Surface 1 forcing the nut and associated components forward until the nut is sufficiently tightened.

Figure 5A:
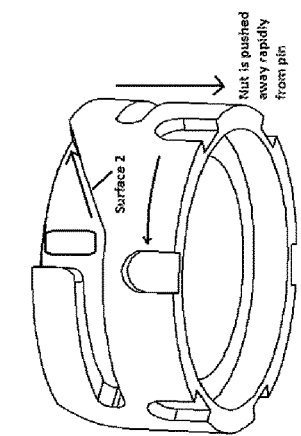
FIGS. 5(a)-(b) demonstrate the disassembly process to using the cam nut.
Figure 5B:
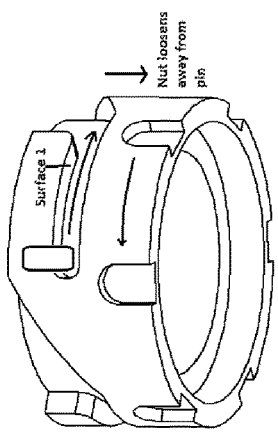

FIGS. 5(a)-(b) demonstrate the disassembly process to using the cam nut. The cam nut disassembly process begins with rotating the cam nut with tools such as handles, wrench or spanner wrenches such that the pin or locking feature slides along the pitched Surface 1 pushing the cam back from the feature and loosening the nut. The second step involves further rotating the cam nut such that the pin slides along the highly pitched Surface 2 rapidly forcing and removing the cam nut and attached components from the pin or locking feature bearing component.

Figure 6:
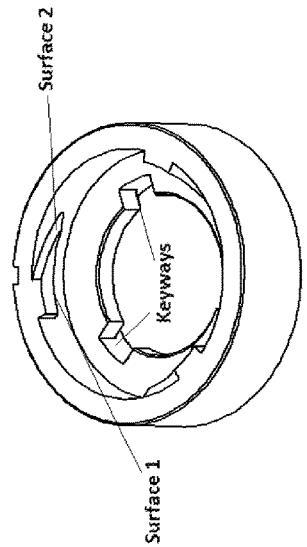
FIG. 6 shows an example external cam nut which would attach to the outside of another die component.
Figure 8:
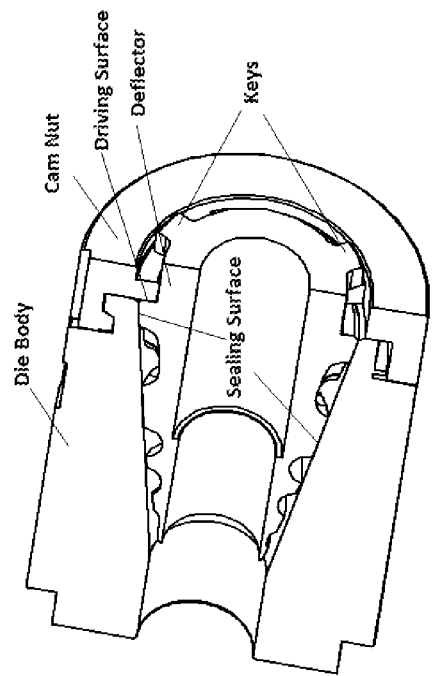
FIG. 8 shows a cross section of a die assembly showing how these components look assembled.
Figure 7:
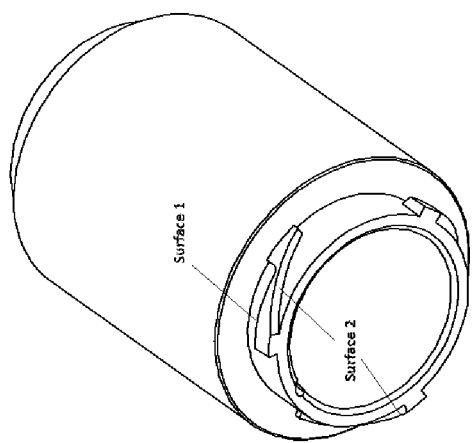
FIG. 7 shows an example die body with machined features on it external surface which will fasten to the corresponding features with a cam nut

In another example the cam nut can attach to the external portion of a component. In this case, the cam nut can also have a pitched surface for tightening as well as highly pitched surface for rapid extraction. FIG. 6 shows an example external cam nut which would attach to the outside of another die component. FIG. 7 shows an example die body with machined features which will fasten to the corresponding features shown in FIG. 6. FIG. 8 shows a cross section of a die assembly and how these components look assembled.

In this example, the cam nut in FIG. 6 will tighten as Surface 1 slides along Surface 1 of the die body in FIG. 7. As it slides along it will be driving forward a die component, or in this case the deflector in FIG. 8, which is what will cause the pressure between the Surface 1 on the cam nut and Surface 1 on the die body. This pressure is caused because as the deflector is driven forward by the cam nut at the driving surface, the deflector's sealing surface meets with the die body. In this example, the cam nut can also rotate without rotating the deflector as it assembles over the deflector via keys and keyways as seen in FIGS. 6 and 8. During disassembly, a the cam nut is rotated such that it loosens, Surface 2 of the cam nut and Surface 2 on the die body will drive the cam nut from the die body quickly due to its high pitch. The cam nut will pull the deflector back for removal with it as the keys on the deflector will contact with the cam nut.

The examples so far have been chosen to illustrate the difference between an internal version of the cam nut and an external version. Also the first example uses pins while the second example uses features machined onto the die body. There are many variations feasible to accomplish the task set out by use of the cam nut and should be considered obvious. These include but are not limited variation in the number of cam features on the nut and corresponding component. In both examples there were three cam features but the cam could be designed to have one or more. Other variations include the degree of pitch of the surfaces as well as the number of pitches of the surfaces machined on the cam nut. Another variation would be one such that the cam nut is retained by the die body while allowing it to rotate. The cam nut could then be used to fasten or remove die components to or from the body. Any tools or means of rotating the cam nut along with features required for their use should be considered obvious and encompassed in the scope of this invention.

Figure 9:
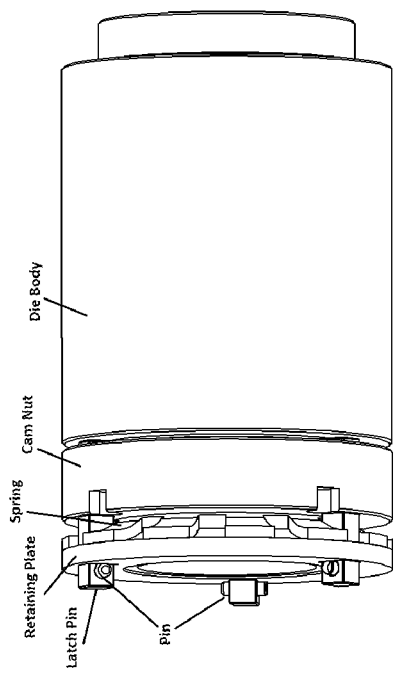
FIG. 9 shows how a cam nut subassembly can be attached to a die body.

Another variation of this device involves the use of a spring or springs in conjunction with the cam nut to apply pressure to attached components. There are various ways to incorporate a spring or springs in this manner. The spring could be one of many varieties including but not limited to Belleville washers and coiled springs. The spring could be integrated into the cam nut or die body or be assembled to either component. In the following example, the spring is attached to an external version of the cam nut with a retaining plate, pins and latch pins to form a cam nut subassembly. A cam nut subassembly can be seen attached to a die body in FIG. 9. The spring is sandwiched between the cam nut and the retaining plate while the latch pins are pinned to constrain the retaining plate. A sub assembly can be understood as a combination of components which when assembled can be viewed as single component of another assembly.

Figure 10:
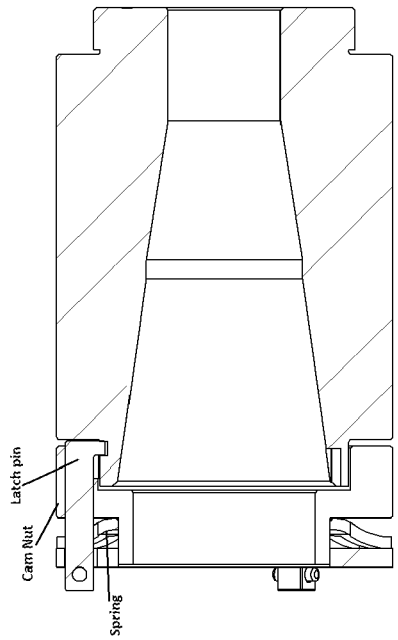
FIG. 10 shows the cross section of the die assembly and shows how the latch pins will hook onto the machined features of the die body which can be seen in FIG. 11.
Figure 11:
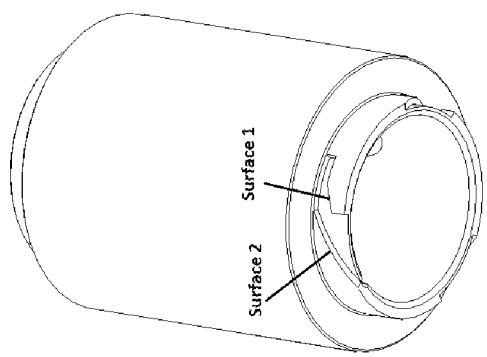
FIG. 11 shows the machined features of the die body which hook onto latch pins shown in FIG. 10.

The cam nut subassembly including a spring may function similarly to the previous examples. FIG. 10 shows the cross section of the die assembly and shows how the latch pins will hook onto the machined features of the die body which can be seen in FIG. 11. The hooks of the latch pins will ride along the pitched surface 1 during assembly until it turns into the slot which does not have a pitch. While this occurs, the spring is being compressed as it forces another component forward. In this case the component would be a deflector which is not shown in the figures. The slot without a pitch allows for a maximum compression of the spring and could prevent over tightening. The slot could also be pitched however to allow for more refined tightening. The use of a spring could also serve as a safety measure because if there was an over pressure condition inside the head, the spring may compress further to relieve some of this pressure. The cam nut subassembly would function similar to the other examples during disassembly as the latch pin's hook will ride along surface 2 resulting in rapid removal as the cam nut is rotated.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device comprising:
a first extrusion die subassembly including a pitched groove and a first sealing surface;
a second extrusion die subassembly including a pin and a second sealing surface, wherein said second extrusion die subassembly is mated to and aligned with the first extrusion die subassembly with the pin of the second extrusion die subassembly engaged in the pitched groove of the first extrusion die subassembly;
the first extrusion die assembly or second extrusion die assembly further including a deflector and further including a flow passage positioned adjacent the sealing surface of the extrusion die subassembly on which the flow passage is positioned,
wherein the pitched groove is angled such that the pin will align with the pitched groove and such that the first extrusion die subassembly can be tightened or loosened from the second extrusion die subassembly in under one rotation of one or more of said extrusion die subassemblies and the fastening direction creates a sealing pressure between the first sealing surface and the second sealing surface confining flow through the flow passage and the loosening direction applies an ejection pressure.

2. The device according to claim 1 wherein said second extrusion die subassembly will eject said first extrusion die subassembly from said second extrusion die subassembly when rotated in the loosening direction.

3. The device according to claim 1 in which a spring operably linked to the first extrusion die subassembly is compressed during the tightening of the device.

4. The device according to claim 1 in which the first extrusion die subassembly attaches to an external surface of the second extrusion die subassembly.

5. The device according to claim 1 in which the first extrusion die subassembly attaches to an internal surface of the second extrusion die subassembly.

* * * * *